United States Patent
Buss Møller

(10) Patent No.: US 10,808,995 B2
(45) Date of Patent: Oct. 20, 2020

(54) PLATE FREEZER AND METHOD FOR OPERATING A PLATE FREEZER

(71) Applicant: A/S DYBVAD STÅLINDUSTRI, Dybvad (DK)

(72) Inventor: Thomas Buss Møller, Støvring (DK)

(73) Assignee: A/S DYBVAD STÅLINDUSTRI, Dybvad (DK)

( * ) Notice: Subject to any disclaimer, the term of this patent is extended or adjusted under 35 U.S.C. 154(b) by 0 days.

(21) Appl. No.: 15/558,991

(22) PCT Filed: Mar. 18, 2016

(86) PCT No.: PCT/DK2016/050081
§ 371 (c)(1),
(2) Date: Sep. 15, 2017

(87) PCT Pub. No.: WO2016/146137
PCT Pub. Date: Sep. 22, 2016

(65) Prior Publication Data
US 2018/0051927 A1    Feb. 22, 2018

(30) Foreign Application Priority Data
Mar. 18, 2015   (DK) .................................. 2015 70155

(51) Int. Cl.
*F25D 31/00*    (2006.01)
*A23L 3/36*     (2006.01)

(52) U.S. Cl.
CPC ............ *F25D 31/001* (2013.01); *A23L 3/364* (2013.01)

(58) Field of Classification Search
CPC ................................ F25D 31/001; A23L 3/364
(Continued)

(56) References Cited

U.S. PATENT DOCUMENTS

| 1,777,094 A | * | 9/1930 | Kolbe ..................... A23B 4/068 |
| | | | 62/341 |
| 1,822,123 A | * | 9/1931 | Birdseye ................. A23L 3/364 |
| | | | 62/341 |

(Continued)

FOREIGN PATENT DOCUMENTS

| DE | 4324192 A1 | 1/1995 |
| EP | 2902736 A1 * | 8/2015 ........... F25D 31/001 |

(Continued)

OTHER PUBLICATIONS

European Patent Office, International Search Report, dated Jun. 10, 2016.

(Continued)

*Primary Examiner* — Paul Alvare
*Assistant Examiner* — Kirstin U Oswald
(74) *Attorney, Agent, or Firm* — Ice Miller LLP

(57) ABSTRACT

The present invention relates to a plate freezer comprising a stack of freezer plates (1), each freezer plate having a first and a second surface (2,3), surrounding a hollow interior through which a coolant may be circulated, where each freezer plate is provided with one or more apertures (10,11), where one or more continuous rods (12,13) is/are inserted through overlapping apertures in the stack of freezer plates, where each rod in a first end is provided with actuator means (20,21), and where engagement members (14) are arranged in communication with one or more rods, where said engagement members may be in a locked position with the rod such that the rod and engagement members move at the same time or an unlocked position where the rod moves relative to the engagement member.

10 Claims, 4 Drawing Sheets

(58) Field of Classification Search
USPC .................................................. 62/341, 378
See application file for complete search history.

(56) References Cited

U.S. PATENT DOCUMENTS

| | | | | | |
|---|---|---|---|---|---|
| 1,924,225 | A | * | 8/1933 | Kanichi Yamane | ........................ F25D 31/001 62/125 |
| 2,232,383 | A | * | 2/1941 | Greig | ........................ A23L 3/36 62/130 |
| 2,280,133 | A | * | 4/1942 | Sundbach | ............ F25D 31/001 62/515 |
| 2,283,923 | A | * | 5/1942 | Bicknell Hall | ........ F25D 31/001 62/341 |
| 2,329,746 | A | * | 9/1943 | Davison | ................ F25D 31/001 62/341 |
| 2,455,867 | A | * | 12/1948 | Kleist | ................... F25D 31/001 62/341 |
| 2,697,920 | A | * | 12/1954 | Gordon Mackenzie | ..................... F25D 31/001 62/341 |
| 2,927,443 | A | * | 3/1960 | Knowles | ............... F25D 31/001 62/341 |
| 2,953,046 | A | * | 9/1960 | Jones | ..................... G05B 19/06 408/3 |
| 3,106,299 | A | * | 10/1963 | Pingon | .................. B66C 23/283 212/176 |
| 3,271,973 | A | * | 9/1966 | Amerio | ................. F25D 31/001 62/341 |
| 3,389,744 | A | * | 6/1968 | Sullivan | .................. A23L 3/364 165/263 |
| 4,180,987 | A | * | 1/1980 | McLaughlin | ........... A23L 3/362 100/194 |
| 4,240,270 | A | * | 12/1980 | McLaughlin | ........... A23L 3/364 100/194 |
| 4,423,604 | A | * | 1/1984 | Riley | .................... F25D 31/001 100/194 |
| 4,553,406 | A | * | 11/1985 | Richelli | ............... B65G 17/002 198/465.1 |
| 4,558,572 | A | * | 12/1985 | Aoki | ..................... F25D 31/001 62/378 |
| 4,593,537 | A | * | 6/1986 | Visser | ..................... A23L 3/362 100/198 |
| 4,607,831 | A | * | 8/1986 | Raybuck | ................. B26D 1/225 271/221 |
| 4,841,881 | A | * | 6/1989 | Battistella | ............... A23L 3/364 108/91 |
| 4,870,829 | A | * | 10/1989 | Oullette | ................... A01N 1/02 62/51.1 |
| 4,907,421 | A | * | 3/1990 | Battistella | ............ F25D 31/001 62/341 |
| 5,035,120 | A | * | 7/1991 | Quilliou | ................... F16H 25/20 100/315 |
| 5,040,383 | A | * | 8/1991 | Gram | ..................... F25D 25/04 100/195 |
| 5,520,010 | A | | 5/1996 | Altman | |

FOREIGN PATENT DOCUMENTS

| | | | | |
|---|---|---|---|---|
| FR | 940178 | | 12/1948 | |
| FR | 940178 | A | 12/1948 | |
| GB | 633277 | A | 12/1949 | |
| GB | 2166536 | A * | 5/1986 | ........... F25D 31/001 |
| GB | 2166536 | A | 5/1986 | |
| GB | 2186674 | A * | 8/1987 | ........... F25D 31/001 |
| RU | 124775 | | 2/2013 | |
| SU | 1057754 | | 11/1983 | |

OTHER PUBLICATIONS

European Patent Office, Written Opinion of the International Searching Authority, dated Jun. 10, 2016.
Danish Patent and Trademark Office, Search Report, dated Oct. 9, 2015.

* cited by examiner

PLATE FREEZER AND METHOD FOR OPERATING A PLATE FREEZER

CROSS REFERENCE TO RELATED APPLICATION

The present application is a U.S. national stage of, and claims the priority benefit of, International Patent Application Serial No. PCT/DK2016/050081, filed Mar. 18, 2016 and also claims the priority benefit of Danish Patent Application Serial No. PA201570155, filed Mar. 18, 2015, the text and drawings of which are hereby incorporated by reference in their entireties.

FIELD OF THE INVENTION

The present invention relates to a plate freezer comprising a stack of freezer plates, each freezer plate having a first and a second surface, surrounding a hollow interior through which a coolant may be circulated, which freezer plates are movably mounted in a frame.

In addition, the present invention relates to a method for operating a plate freezer comprising a stack of freezer plates.

BACKGROUND OF THE INVENTION

In the processing of food there is often a freezer installation involved in that quite a number of food items are stored, transported and sold as frozen foods.

For example, on some fishing vessels, e.g. trawlers, the fish are frozen into blocks and are stored in freezers on the fishing vessel while at sea. Then, when the fishing vessel returns to a harbour, the frozen fish is delivered to a fishing processing plant on shore for further processing, e.g. after thawing.

Alternatively, a product to be frozen is packaged and the product in the package is frozen in a freezer.

Freezing is a very energy-intensive process requiring an effective cooling plant as well as efficient freezer means. The same considerations apply to other technical fields where it is desirable to utilise freezer installations.

In the art a number of freezer designs exist which are specifically designed to save energy in order to make the freezing process cheaper and potentially also faster.

Horizontal plate freezers typically comprise a number of horizontal plates in a horizontal stack. The plates are constructed such that cooling medium may be guided through the plates. The plates are brought in close physical contact with the products to be frozen.

The cooling medium is usually supplied from a cooling media supply plant to the interior of the plates in the freezer via a pipe system.

After placement of products on the plates, the plates are pushed together in a vertical direction for slightly squeezing the product arranged between the plates in order to create a good thermal conductive contact between the products to be frozen and the freezing plates. Thus, the product to be frozen is brought into contact with two plates: The upper surface of the plate on which the product is placed and the lower surface of the plate above the product. Usually a hydraulic ram provides a pressure to the entire stack of plates, which ensures optimal contact between the product and the horizontal plates and thus optimizes the freezing process. In addition the blocks of frozen product are homogenous in shape.

The prior art horizontal plate freezers have different means for moving the plates vertically thereby creating larger openings between two adjacent plates in order to be able to place the product to be frozen between adjacent plates and subsequently removing the product from the plates after freezing.

In some horizontal plate freezers the entire stack of plates are separated from each other when emptying the freezer. This results in interruption of the freezing process in products on all the plates, while the frozen product is removed from a single plate. This is inconvenient because the freezing capacity of the freezer is not utilised between the other plates when the frozen product is removed from a single plate. This further results in an overall increased consumption of time for freezing a certain product sufficiently and the full capacity of the horizontal plate freezer is not fully utilised.

In other horizontal plate freezers the entire stack of plates is lifted into position in relation to the conveyor or other handling unit which is to receive the frozen product arranged between two plates. When the relevant plate in the horizontal freezer is empty, the position of the entire stack of plates is lifted or lowered and thereby adjusted in height in order to put another plate to be emptied in level with the conveyor or other handling unit etc. for each plate in the horizontal plate freezer. This procedure of adjusting the position is time-consuming. This construction also results in a relatively tall building height of the horizontal freezer.

The overall height of the horizontal freezer is important when the freezer is mounted e.g. on board a marine fishing vessel, in which the overall height of the freezer is determined by the height available in the vessel. Thus, when installing such horizontal freezers in a fishing vessel, the overall height of the freezer and thereby the fishing capacity is limited by the height available in the vessel.

In another known horizontal plate freezer, having a low overall total height, an alternative way is provided for lifting and lowering the horizontal plates when filling or emptying product from the freezer. The plate freezer comprises horizontally movable opening stations, which travel upwards/downwards at each of the ends of the stack of plates. The opening station comprises two arms, which are intended for moving the relevant freezer plates away from each other for providing access to the freezer station, i.e. the freezer space between the two adjacent plates, such as when filling and/or emptying the relevant station. After emptying, and optionally subsequent filling, of the freezer station, the opening station withdraws the arms and travels upwards or downwards to the next freezer station to be emptied and/or filled etc.

This results in a reduced overall total height of the freezer, when compared to the above-mentioned alternative known horizontal freezers because the freezer plates only need to be lifted by a short distance corresponding to the space needed for filling or emptying a single freezer station. However, there is a significant load on each freezer plate, when they are lifted, in particular, when the freezer plates are loaded with products while lifted. This may further result in the freezer plates being bent during lifting, which causes stress in the freezer plate material, which in rare cases may cause formation of cracks in the plates, whereby coolant may escape from the interior of the plate, whereby repair and substitution of the freezer plate(s) are needed. This is highly inconvenient, in particular if the horizontal plate freezer is installed on a ship, such as a fishing vessel, which stays at sea for a certain period while catching and subsequently freezing the fish in blocks in the horizontal freezer, because the vessel needs to seek harbour for repair of the freezer.

OBJECT OF THE INVENTION

It is an object of the present invention to provide horizontal plate freezers which reduce the overall total height of horizontal plate freezers even further.

It is also an object of the present invention to provide plate freezers with increased freezing capacity in a pre-defined space having a fixed total height.

In addition, it is an object of the present invention to provide plate freezers having a simple and reliable, yet robust and inexpensive construction of the system for lifting/lowering of the freezer plates.

Further, it is an object of the present invention to provide plate freezers, which are controlled in a simple and reliable way.

In addition, it is an object of the present invention to provide a method of operating a plate freezer, in an efficient and reliable way, and whereby fast freezing is obtained, which maintains the natural quality of the products.

In addition, when freezing products into blocks, the blocks obtained are homogenous in shape.

DESCRIPTION OF THE INVENTION

These objects are obtained by a plate freezer comprising a stack of freezer plates, each freezer plate having a first and a second surface, surrounding a hollow interior though which a coolant may be circulated, which freezer plates are movably mounted in a frame. The plate freezer comprises a stack of freezer plates, where at least one freezer plate has a first and a second surface, first and second end sides and first and second long sides, said surfaces and sides surrounding a hollow interior, through which a coolant may be circulated, where each freezer plate is provided with one or more apertures in or adjacent the end sides of each freezer plate, where one or more continuous rods is/are inserted through overlapping apertures in the stack of freezer plates, where each rod in a first end is provided with actuator means, and where engagement members are arranged in communication with the one or more rods adjacent the second surface of the freezer plates, where said engagement members may be in a locked position with the rod such that the rod and engagement members move at the same time or an unlocked position where the rod moves relative to the engagement member.

A freezer station is defined as the freezer capacity area between two adjacent freezer plates. During filling/emptying of a single freezer station, the remaining freezer stations are kept in their closed position, and thus maintain the optimal contact between the freezer plates and the product in these freezer stations and thus continue the freezing process while another freezer station is filled and/or emptied. This results in reduction of the overall time necessary for freezing the products in the freezer, leading to saving in energy used per kilo product to be frozen, and the overall capacity of the freezer is optimised. Further, the plate freezer has a simple construction, because the opening station can be avoided. In addition, the hydraulic ram, which provides pressure to the stack of plates, can be avoided. This further results in reduction of the overall height of a plate freezer having a certain number of freezer plates, i.e. having a certain freezing capacity. Alternatively, a plate freezer having an increased freezing capacity, i.e. having an increased number of freezer plates, may be installed in the same volume of space.

Another significant advantage by this arrangement, i.e. the possibility of opening one freezing station at a time, is the fact that the required freezing capacity of the installation may be designed to a significantly smaller requirement, in that with ordinary freezer installations where all freezing stations are emptied/filled at the same time, the installation supplying freezing media, shall be able to supply a substantial amount, in order to initialize the freezing process in all freezing stations. However, by only having to initially freeze a limited amount of freezing stations at one time, in that the remaining freezing stations are already frozen, and only require a maintenance supply of freezing media, the freezing media supply station will either only be required to supply very little extra media or may altogether be dimensioned smaller, and thereby the overall cost may be reduced.

In this connection it should be noted that the formulation "where each freezer plate is provided with one or more apertures in or adjacent the end sides of each freezer plate" shall be understood as encompassing embodiments where holes i.e. apertures having material along the entire periphery as well as cut-outs, i.e. openings where material (freezing plate) is only present for part of the periphery.

The relatively simple arrangement of having a rod which goes through apertures in all the freezer plates and furthermore having engagement members arranged for each freezer plate such that the engagement member may be locked onto the rod or allow the rod to move freely relative to the engagement member provides the possibility by selecting the engagement members which are locked and activating the one or more rods to move that particular freezing plate without influencing adjacent freezer plates. The locking mechanism provided in the engagement members may be very simple in that the object of the engagement member is to ensure that the engagement member when locked to the rod does not slide relative to the rod and that the movement of the rods transfers the forces of movement via the engagement members to the freezer plates such that the particular freezer station is opened as discussed above. Typically, two rods will be provided, one in each end of the freezer plate and substantially centrally in the short sides of the freezer plates such that there is a balance. However, for most purposes four rods, two in each end of the freezer plates will be provided, in order to supply a very stable construction.

With this construction a freezing station may simply be opened by activating the engagement members adjacent the second surface of the freezing plate in the top part of the freezing section such that the engagement members engage the rod and thereafter activate the actuators which will move the rod. The travel of the engagement members or the locking members provided in the engagement members may be kept relatively short, i.e. a few millimeters, which is very simple to control and activate and at the same time in order to open a freezing station only for example two actuators connected to rods in either end of the freezing plate need to be activated. This provides for an overall very simple relatively inexpensive and very reliable construction. At the same time the control of the freezer is complete in that all the engagement members are easy to control and activation of the actuators is also very easy to control. In this connection it should be contemplated that engagement members relating to the same secand surface of a freezer plate may be activated simultaneously and by the same control signal, i.e. such that separate control signals shall not be conveyed to each and every engagement member at the particular second surface of the freezer plate in the freezing station which it is desired to open.

As only the desired freezing station is opened, the rest of the freezer is kept in its optimal state, i.e. the thermal transfer between the freezer plate and the product is optimized and the overall time needed for freezing the products is reduced and the frozen products obtain or maintain their optimal shape. Furthermore, the engagement members and the actuators are easy to control and as such it is not necessary to install sensors for monitoring the position for example of the freezer plates, the actuators, the rods or the like. This is an advantage as sensors are often quite sensitive, especially at low temperatures and may thus cause the overall system to become sensitive and potentially unreliable. These drawbacks are drastically reduced or even avoided in the present invention simply because the need for sensors mounted in relation to the freezer is reduced significantly.

In a further advantageous embodiment each engagement member substantially surrounds one continuous rod, where said engagement member has one or more locking members which locking member may be brought into and out of locking engagement with the rod, thereby in locked engagement moving the engagement member into contact with a freezing plate, where further movement also moves the freezing plate thereby opening a section.

When activated the locking members ensure that there is a firm grip between the engagement member and the rod such that as the rod moves also the engagement member and thereby the associated adjacent freezing plate will move together with the rod.

In order to further improve the grip between the rod and the locking members the rod and/or the one or more locking members may be provided with serrations, ridges or profiling in order to improve the engagement between the rod and the locking members provided in the engagement members.

Alternatively, the rod and the locking members may be provided with cooperating threads. In these embodiments the actuator will typically be designed to rotate the rod such that as the locking members are engaged with the rod, the threads will grip each other and will work as a bolt-and-nut connection such that by rotating the rod, the locking members will be moved either upwards or downwards due to the engagement of the threads.

The engagement members may be connected to a freezing plate, such that when the engagement members are activated and the rods moved whereby the freezing plates are brought closer to adjacent freezer plates, this system will serve to close the freezer.

Naturally, the engagement members as well as the actuators may be driven and operated by hydraulic, pneumatic, electrical or gas means depending on the circumstances and the designer's choice.

The plate freezer according to the present invention may either be a plate freezer having the freezer plates arranged horizontally or vertically. Both types of plate freezers are equally usable with the inventive means of opening a freezing station.

The invention is also directed at a method for operating a plate freezer having the features as described above. Naturally, the method benefits from the easy and very simple construction and operational features of the plate freezers as described above.

An additional feature obtained with the present invention is the fact that each freezing station does not have to have the same height, i.e. be able to accommodate the same types or sizes of products. Simply by allowing the engagement members to be arranged adjacent the second surface of the freezing plate and the rods to freely move with respect to the engagement members in the unlocked position any distance between the freezing plates may be obtained and therefore the freezer is extremely versatile in that it may economically be operated to freeze various types and sizes of products.

Above, the invention has been described with respect to advantageous embodiments of the invention, but it is clear that further variations may be contemplated without departing from the scope of the invention, both as set forth above and as defined in the appended claims. Below a specific embodiment of the invention will be described, but the embodiment shall not be construed as limiting on the scope of protection which is defined in the appended claims.

DESCRIPTION OF THE DRAWING

The present invention will be described with reference to the drawings, in which FIG. 1 schematically illustrates the basic principles of the present invention

DETAILED DESCRIPTION OF THE INVENTION

Figure 1:
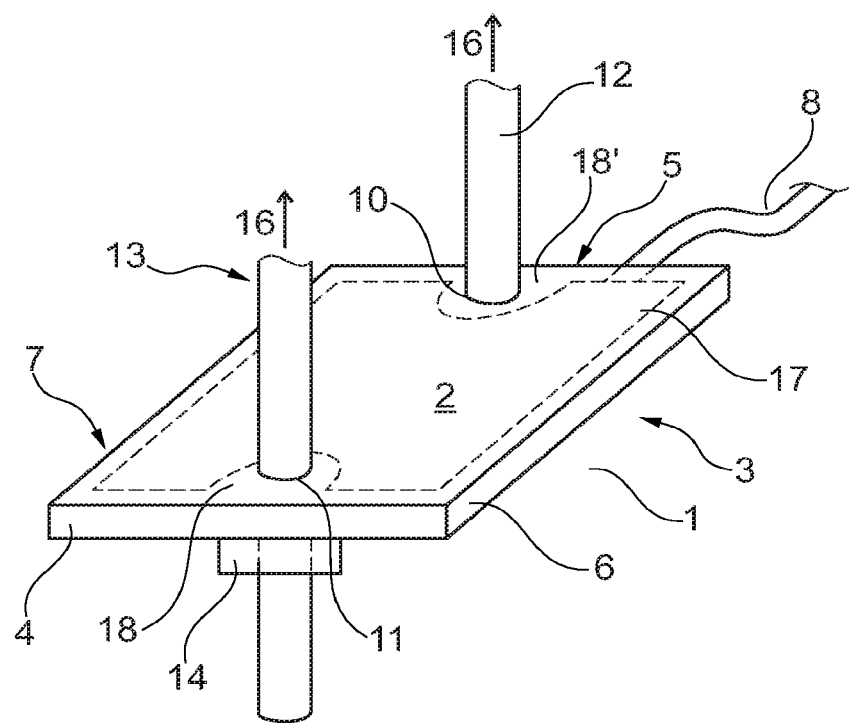

In FIG. 1 is schematically illustrated the basic principles of the present invention. A freezer plate 1 has first and second surfaces 2, 3 and first and second end sides 4, 5 and first and second long sides 6, 7. These sides 4, 5, 6, 7 together with the surfaces 2, 3 delimit a hollow interior through which a coolant may be circulated. The coolant is supplied for example by the hose 8 from a central cooling plant which is not part of the present invention. In each freezer plate 1 is provided two apertures 10, 11. In practice four apertures will typically be provided adjacent each side 4, 5 in order to stabilize the freezing plate as will become apparent from the further discussion below.

Figure 2:
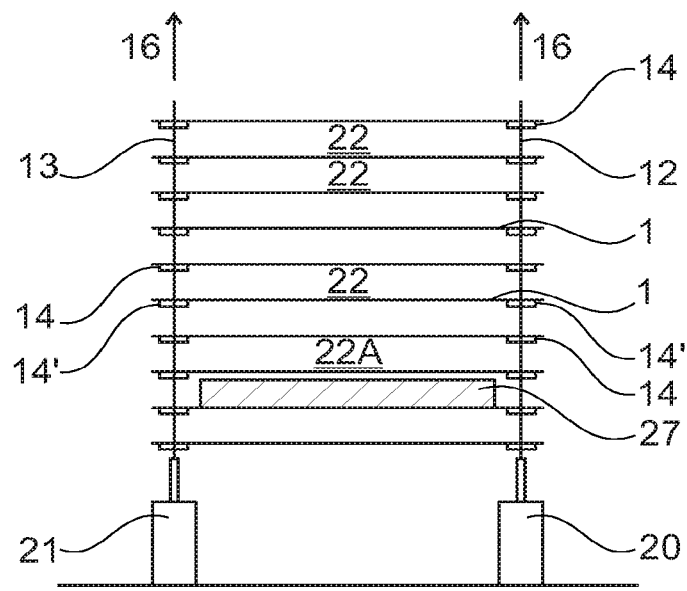
FIG. 2 shows a side or top view of a plate freezer according to the present invention, without its cover.

Through each aperture 10, 11 is inserted a longitudinal rod 12, 13. Turning the attention shortly to FIG. 2 a plate freezer comprising a large number of superposed freezing plates is illustrated. As is evident from FIG. 2 the longitudinal rods 12, 13 are arranged through overlapping apertures in superposed freezing plates such that the two longitudinal rods 12, 13 will traverse the plurality of freezer plates illustrated in FIG. 2.

Back in FIG. 1 an engagement member 14 (only visible for the longitudinal member 13) is provided on each longitudinal rod 12, 13 immediately under and in contact with the freezing plate 1. The engagement member 14 is arranged adjacent the second surface of the freezer plate, i.e. the underside of the freezer plate 1 and the engagement members 14 may be manipulated such that they are either in engagement with the longitudinal rods 12, 13 or manipulated into an unlocked position where they are not in contact with the rods 12, 13 such that the rods may move independently of the engagement member 14. When the engagement member 14 is in engagement with the rods 12, 13 and the rod moves for example in a direction indicated by the arrow 16, the freezer plate 1 will due to the engagement of the engagement member 14 with the rods 12, 13 move the freezer plate in the same direction indicated by the arrow 16.

Turning to FIG. 2 the rods 12, 13 are each connected to actuator means 20, 21. The actuator means will when activated move the longitudinal rods 12, 13 in the direction indicated by the arrow 16 or in the opposite direction.

FIG. 2 illustrates a schematic construction of a plate freezer according to the invention. The freezer plates 1 may be arranged on top of each other or arranged next to each other such that FIG. 2 may either be a vertical cross-section of a plate freezer or be a horizontal cross-section depending on the desired construction. Between each freezer plate 1 is created a freezing section 22. In the illustrative embodiment in FIG. 2 nine freezer sections are illustrated. It is clear, however, that fewer or more freezer sections may be arranged depending on the plate freezer in question. In order to open freezer section 22A the engagement means 14' shall be activated such that they are in the locked position, i.e. such that the engagement means 14' are in engagement with the rods 12, 13. At this time all other engagement means 14 are in an unlocked position such that the rods when activated by the actuators 20, 21 in the direction indicated by the arrow 16 will slide through the apertures 10, 11 provided in the freezer plates 1, but due to the engagement of the engagement means 14' the freezer plate above freezer section 22A will be elevated providing the possibility either to empty or to fill the freezing section 22A.

An object 27 to be frozen is schematically illustrated between two freezer plates, and in a zone of the freezer plates 2 free of the engagement means 14.

In a vertical configuration the freezer section 22A may be closed after use simply by releasing the engagement members 14' and retrieving the actuators 20, 21 in a direction opposite the arrow indicated by 16 whereby gravity will force the freezing section 22A shut. In horizontal plate freezers extra engagement means (not illustrated) may be arranged on the upper side 2 farthest away from the actuators 20, 21 such that by engaging these special engagement means manipulating them into the locked position and withdrawing the actuators 20, 21 the withdrawal action will close the freezer section 22A.

In order not to damage the freezer plate 1 the freezer plate is as illustrated by the dashed line 17 in FIG. 1 provided with relatively solid sections 18, 18' in the vicinity of the apertures 10, 11. These relative solid sections are provided in order to be able to transfer the load when the freezer plates are moved in order to open and close freezing sections as discussed above. By having relatively solid sections it is the compressive force of the material from which the freezer plates are made as such which will have to absorb the forces whereas if the freezer plates were hollow, as is the case for most of the area of the freezer plates due to the circulation of the freezing medium, the freezer plates could be damaged and freezing medium could escape to the ambient environment. A further feature is also that as no compression occurs in the freezer plates due to the movement of the rods 12, 13 there is no bending imparted to the freezer plates and thereby the wear and tear on the freezer plates are drastically reduced compared to common plate freezers which should provide for an extended service life.

In order for the actuators 20, 21 to move the longitudinal rods 12, 13 the actuators may be hydraulically operated telescopic actuators such that by increasing the pressure in the cylinders the actuator will extend and by decreasing the oil pressure the actuator will retract. These are quite common operational actuators used for a number of purposes.

Figure 4:
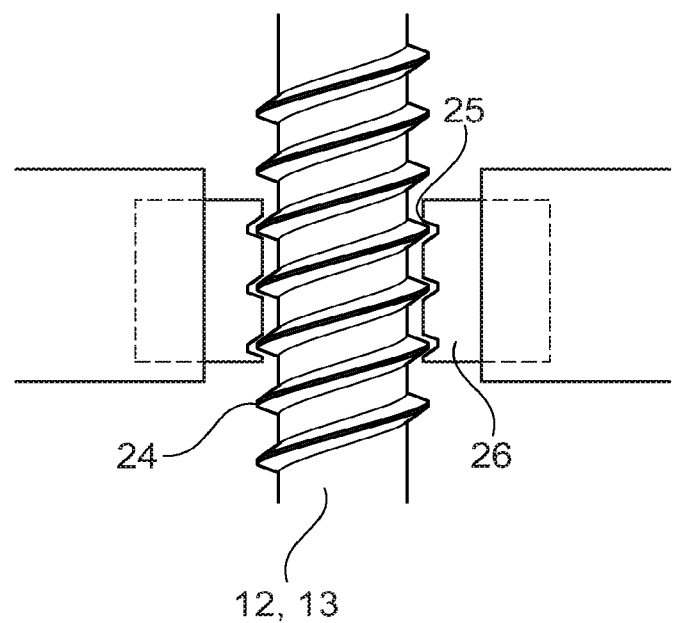
FIG. 4 shows an embodiment of engagement between the engagement member and the rod

Alternatively, the actuators 20, 21 may be rotated and the rods 12, 13 as illustrated in FIG. 4 being provided with a thread 24. The engagement members 14, 14' are provided with displaceable locking members 26, which are also provided with a thread 25. Consequently, when the rods 12, 13 are rotated and in unengaged relationship with the locking members 26 to such a degree that rotation of the rods is allowed, the thread will cause the engagement members to be displaced along the rods. The displacement direction is determined by the rotation direction of the rods.

Figure 3:
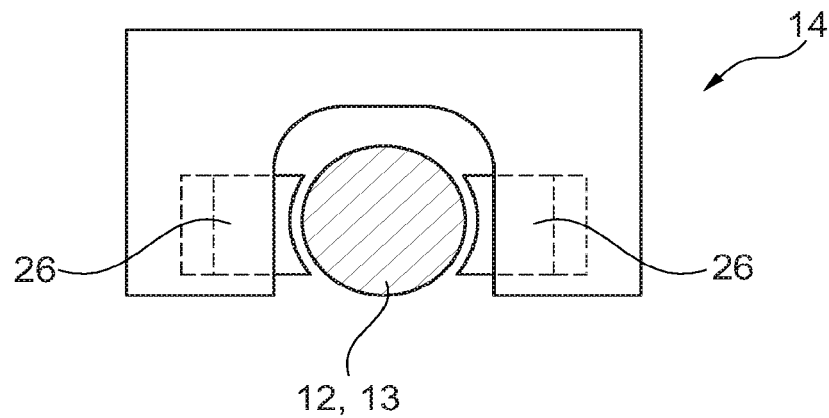
FIG. 3 shows an engagement member.

In FIG. 3 is illustrated a plane view of an engagement member arranged around a rod 12, 13. The engagement member is provided with locking members 26 which are housed in the engagement member 14. Also housed in the engagement means are provided actuation means (not illustrated) which causes the locking members 26 to be displaced relative to the engagement member into and out of engagement with the rods 12, 13.

The locking members and/or the surface of the rods may be provided with serrations, small ridges or other unevenness's in order to increase the friction between the rod and the locking members 26.

Figure 5:
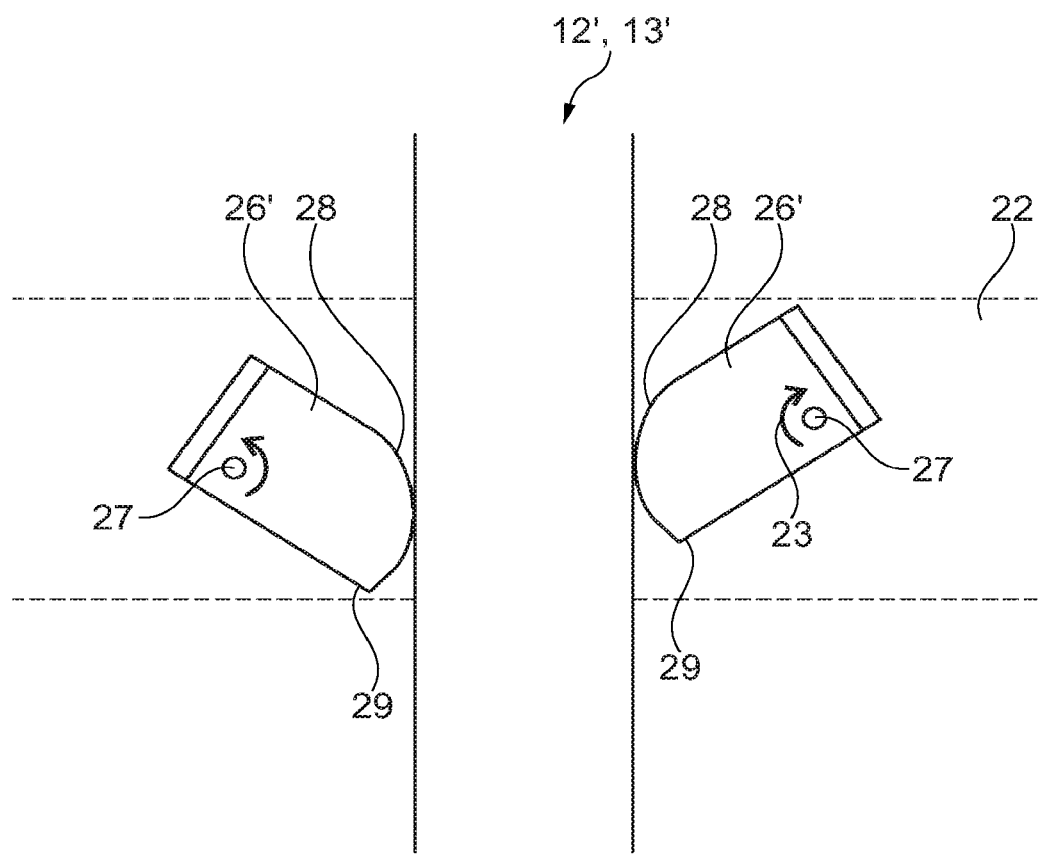
FIG. 5 shows a further example of locking members engaging a rod

In FIG. 5 a further example of locking members 26' engaging a rod 12', 13' is illustrated. The engagement members 26' are arranged for rotation about an axle 27. Furthermore the engagement surface 28 of the engagement member 26' has a curvature, such that the distance between the surface of the engagement surface and the axle's axis of rotation increases towards the point 29. In this manner if the freezing plate 22 is urged downwards or the rod 12', 13' moved upwards the engagement members 26' will be urged into ever tighter engagement with the rod, thereby increasing the grip between the engagement members and the rod.

As indicated by the arrows 23 the engagement members may be urged away from engagement with the rod in order to allow the freezing plate 22 to move relative to the rod 12, 13.

For all the embodiments mentioned above, the advantages of the inventive concept are all maintained. It is possible to open only one freezing station at a time, it is possible to independently adjust the height of each freezing station allowing the freezer to accommodate various package sizes to be frozen.

Figure 6:
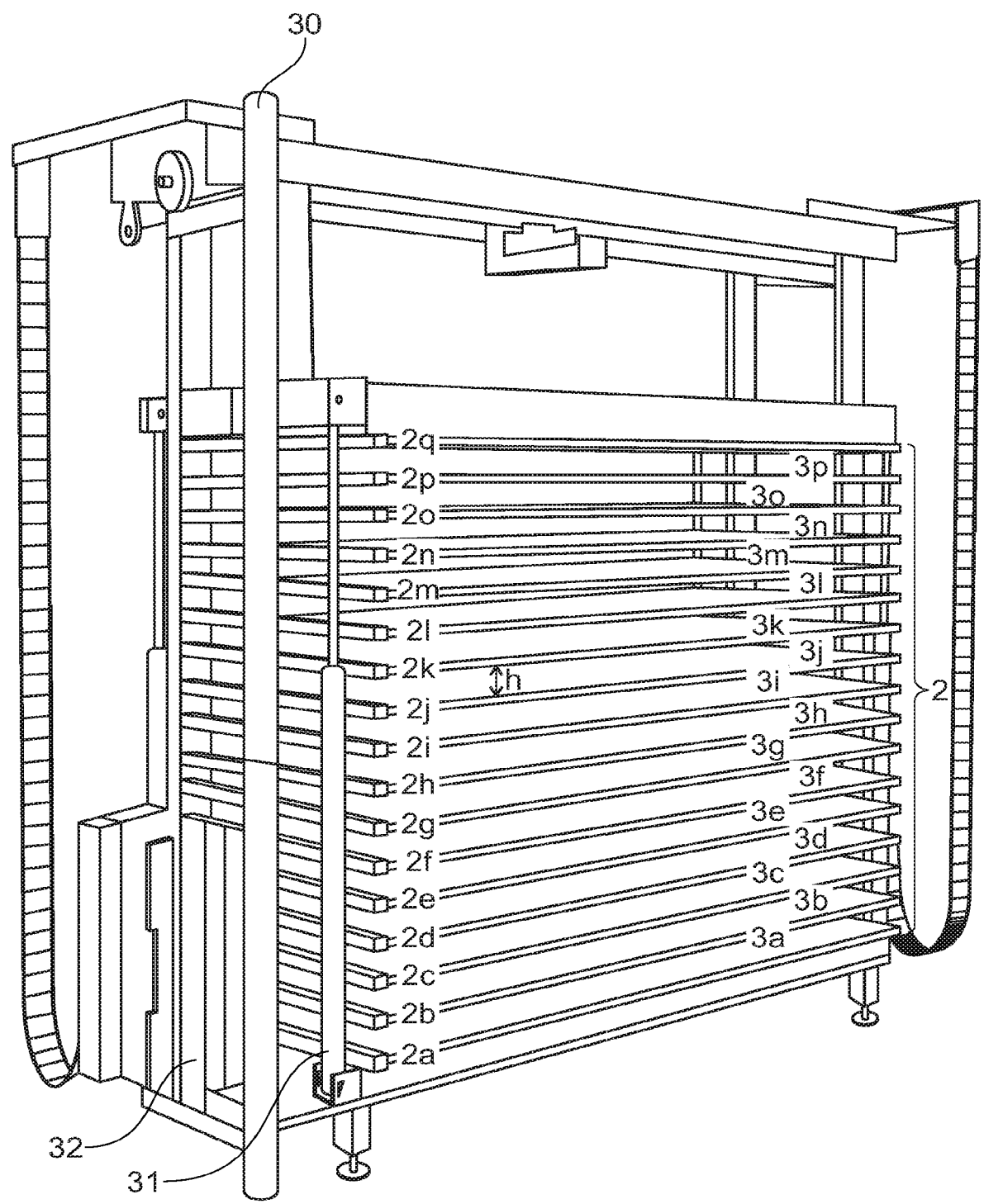
FIG. 6 shows a known horizontal plate freezer provided by Dybvad Staalindustri A/S (DSI), without its cover.

FIG. 6 shows a prior art horizontal plate freezer. Prior art plate freezers, e.g. of the type used in the food industry, comprises a row or stack of flat juxtaposed cooling units 2, freezer plates 2a-2q. The freezer plates are held in position by a frame 30.

Between two adjacent freezer plates 2 there are openings 3a-3p, also called freezing stations, or spaces where products can be arranged and subsequently frozen.

The products are preferably food products, e.g. fish, meat, fruit or vegetables, which can be frozen either in blocks for subsequent further thawing and/or processing in the industry, or the products can be frozen after being wrapped in packages which are then ready for sale.

Coolant is circulating through the interior of the freezer plates 2 and is supplied from a cooling plant (not shown) via hose connections (not shown) to each of the freezer plates 2 and returns to the cooling plant via additional hose connections (not shown).

When the spaces between the freezer plates 2 are filled with products to be frozen, a large actuator 31 in each corner of the stack of freezer plates 2 is activated to pull a ram downwards for providing a certain pressure on the stack of freezer plates while freezing the products arranged on each freezer plate 2a-2p. Thereby, the product is squeezed slightly between two adjacent freezer plates 2a-2q, whereby the product is in contact with the freezer plates on two sides, i.e. on the upper and the lower surfaces of the product. Thereby a quick and even freezing process is obtained. In addition, the expansion of the frozen products is controlled, because of the slight pressure added to the stack of plates thereby ensuring frozen blocks of product, which are homogenous in shape. Thus, such blocks are easily stacked after freezing. When the products are packaged prior to freezing, there is less risk that the frozen product alters the shape of the package, when the stack of plates is squeezed slightly.

An opening station is provided at each end of the stack of freezer plates 2. The plate freezer comprises horizontally movable opening stations 32, which travels upwards/downwards at each of the ends of the stack of freezer plates 2. The opening station 32 comprises two arms (not shown), which are intended for moving two adjacent freezer plates 2 away from each other for providing access to the freezer station, i.e. the freezer space 2a-2q between the two adjacent freezer plates 2, such as when filling and/or emptying the relevant freezer station 2. After emptying, and optionally subsequent filling, of the freezer station 2, the opening station withdraws the arms and travels upwards or downwards to the next freezer station 2 to be emptied and/or filled etc.

The invention claimed is:

1. A plate freezer comprising a stack of freezer plates, where at least one freezer plate has a first and a second surface, first and second end sides and first and second long sides, said surfaces and sides surrounding a hollow interior, through which a coolant may be circulated, where each freezer plate is provided with one or more apertures in or adjacent the end sides of each freezer plate, where one or more continuous rods are inserted through overlapping apertures in the stack of freezer plates, where each rod in a first end is provided with actuator means, and where engagement members are arranged in communication with the one or more rods, where said engagement members may be in a locked position with the rod such that the rod and engagement members move at the same time when activated by the actuator means or an unlocked position where the rod when activated by the actuator means moves relative to the engagement member, where each engagement member substantially surrounds one continuous rod, where said engagement member has one or more locking members which may be brought into and out of locking engagement with the rod, thereby in locked engagement moving the engagement member into contact with a freezing plate, where further movement also moves the freezing plate thereby opening a section.

2. The plate freezer according to claim 1, wherein each engagement member substantially surrounds one continuous rod, where said engagement member has one or more locking members which locking member may be brought into and out of locking engagement with the rod, thereby in locked engagement moving the engagement member into contact with a freezing plate, where further movement also moves the freezing plate thereby opening a section.

3. The plate freezer according to claim 1, wherein the rod and/or the one or more locking members are provided with serrations, ridges, profiling for improved engagement.

4. The plate freezer according to claim 1, wherein the rod and the one or more locking members are provided with cooperating threads, and where the actuator causes the rod to rotate.

5. The plate freezer according to claim 1, wherein the engagement members are hydraulically, pneumatically, electrically or gas operated.

6. The plate freezer according to claim 1, wherein the freezer plates are either mounted horizontally or vertically.

7. A method for operating a plate freezer comprising a stack of freezer plates, said stack of freezer plates is arranged in a frame, which frame comprises means for pressing the stack of freezing plates together, and where the space between two freezer plates arranged adjacent to each other is called a section, where said frame allows for movement of freezer plates allowing at least one section to be opened, and where at least some of the freezer plates have a first and a second surface, first and second end sides and first and second long sides, said surfaces and sides surrounding a hollow interior through which a coolant may be circulated, where each freezer plate is provided with one or more apertures in or adjacent the end sides of each freezer plate, where one or more continuous rods are inserted through overlapping apertures in the stack of freezer plates, where each rod in a first end is provided with actuator means to move the rod, and where engagement members are arranged in communication with the one or more rods or the plates, adjacent the freezer plates, where said engagement members may be in a locked position with the rod such that the rod and engagement members move at the same time when activated by the actuator means or an unlocked position where the rod when activated by the actuator means moves relative to the engagement member, where each engagement member substantially surrounds one continuous rod, where said engagement member has one or more locking members which may be brought into and out of locking engagement with the rod, thereby in locked engagement moving the engagement member into contact with a freezing plate, where further movement also moves the freezing plate thereby opening a section, which method comprises when opening a section between two freezer plates:
 a) lock the engagement members relating to the freezing plate in the section which is to be opened;
 b) either before 1. or now de-activate the pressure in the means for pressing the frame together and release the frame;
 c) activate the actuators associated with the rods, causing the rod to move together with the engagement means in the section which it is desired to open;

when closing one or more sections the engagement members are released from their engagement with the rods and optionally means for pressing the entire stack of freezing plates is activated.

8. The method according to claim 7 wherein after initiation of the freezing process, the actuators and/or engagement members mounted between two adjacent freezing plates are released and where the pressure in the means for pressing the entire stack is diminished such that the freezing plates may move relative to the expansion of the product to be frozen.

9. The method according to claim 7, further comprising calibrating the distance between adjacent freezing plates by activating or releasing other engagement means and/or actuators.

10. The method according to claim 7 wherein when the freezer plates are arranged horizontally in a stack, also engagement means above the engagement means in the section which is to be opened are activated into locking engagement with the rods.

* * * * *